US011207708B2

(12) United States Patent
Dubiel

(10) Patent No.: US 11,207,708 B2
(45) Date of Patent: Dec. 28, 2021

(54) HANDHELD FLUID APPLICATOR

(71) Applicant: Chapin Manufacturing, Inc., Batavia, NY (US)

(72) Inventor: David Dubiel, N. Chili, NY (US)

(73) Assignee: Chapin Manufacturing, Inc., Batavia, NY (US)

(*) Notice: Subject to any disclaimer, the term of this patent is extended or adjusted under 35 U.S.C. 154(b) by 480 days.

(21) Appl. No.: 16/229,695

(22) Filed: Dec. 21, 2018

(65) Prior Publication Data
US 2020/0197977 A1    Jun. 25, 2020

(51) Int. Cl.
B05C 13/02 (2006.01)
A01G 7/06 (2006.01)
B05C 5/02 (2006.01)
B05C 17/015 (2006.01)
B05C 17/005 (2006.01)
B05C 11/10 (2006.01)

(52) U.S. Cl.
CPC ............ B05C 13/02 (2013.01); A01G 7/06 (2013.01); B05C 5/027 (2013.01); B05C 5/0212 (2013.01); B05C 11/1044 (2013.01); B05C 17/00596 (2013.01); B05C 17/015 (2013.01)

(58) Field of Classification Search
USPC ............ 118/38, 264; 47/1.5, 1.7; 401/9, 10
See application file for complete search history.

(56) References Cited

U.S. PATENT DOCUMENTS 4,947,580 A    8/1990    Moore
5,329,727 A *  7/1994    Dixon ............... A01M 21/043
                                           15/210.1
8,663,176 B2   3/2014    Rad
8,944,709 B2   2/2015    Ellsworth et al.
2014/0128802 A1 5/2014   Omid
2018/0125055 A1 5/2018   Petersen

FOREIGN PATENT DOCUMENTS

JP    2010011810    1/2010
KR    101207285    12/2012
WO    2016165717   10/2016
WO    2018137000    8/2018

OTHER PUBLICATIONS

"Dagato Weeder & Bundle", https://www.progreen.co.uk/dagato-weeder-bundle.

* cited by examiner

Primary Examiner — Yewebdar T Tadesse
(74) Attorney, Agent, or Firm — Woods Oviatt Gilman LLP; Katherine H. McGuire, Esq.

(57) ABSTRACT

An applicator for introducing a fluid to a plant includes a first arm and a second arm pivotally connected to one another at one end. The other ends are spaced apart to receive the plant therein when the applicator is in a rest position and are driven together upon pivoting of the arms to place the applicator in an application position. A fluid injector is mounted on the first arm and includes an injector body and a diaphragm defining a plurality of channels. The diaphragm includes a pliable dome defining a reservoir to receive the fluid and a plurality of applicator nodes. A respective applicator node is positioned near a terminus of each channel. A driving member engages the pliable dome when the applicator is pivoted to the application position. The pliable dome is then compressed by the driving member to direct the fluid through the plurality of channels.

8 Claims, 4 Drawing Sheets

HANDHELD FLUID APPLICATOR

FIELD OF THE INVENTION

The present invention generally relates to fluid applicators, and more particularly to a handheld stapler-type fluid applicator, and still more particularly to a handheld fluid applicator that dispenses fluid only when the applicator is manually compressed.

BACKGROUND OF THE INVENTION

As their name implies, broadcast sprayers typically apply a spray of material over a broad area. While these sprayers may be suitable for general management of wide swaths of vegetation, such sprayers are not amenable for targeted application of material, such as an herbicide, to a single plant or portion of a plant. As a result, a number of handheld fluid applicators have been developed which seek to address the need for selective, targeted application. However, heretofore handheld applicators suffer from a number of drawbacks. First, fluid control is an issue because a user of the applicator may come into contact with the fluid intended to be applied to the plant. That is, many fluids used in plant management may be harmful to humans upon exposure to the skin. Compounding this issue, a number of applicators include piercing elements that are designed to puncture, cut or tear the plant so that the fluid may enter the interior structures of the plant. However, these piercing elements may also puncture, cut or tear flesh, such as a finger. Coupled with poor fluid control, harmful chemicals may bypass the skin layer and be directly absorbed within the bloodstream.

Thus, there remains a need for a handheld fluid applicator configured to dispense a fluid at a targeted location while minimizing exposing the user to the fluid being applied and reducing the possibility of encountering any piercing elements when applying the fluid. The present invention satisfies these, as well as other, needs.

SUMMARY OF THE INVENTION

In view of the above and in accordance with an aspect of the present invention, the present invention is generally directed to an applicator for introducing a fluid to a selected portion of a plant. The applicator comprises a first arm having a first end and an opposing second end and a second arm having a first end and an opposing second end. The first ends are pivotally connected to one another and the second ends are spaced apart so as to receive the selected portion of the plant therein when the applicator is in a rest position. The second ends are configured to be driven together upon pivoting of the arms to place the applicator in an application position. A fluid injector is mounted on the second end of the first arm and includes an injector body and a diaphragm coupled to the injector body and defining a plurality of channels therebetween. The diaphragm includes a pliable dome defining a reservoir configured to receive an aliquot of the fluid and a plurality of applicator nodes. A respective applicator node is positioned proximate a terminus of each respective channel of the plurality of channels. A driving member is mounted onto the second end of the second arm and is configured to engage the pliable dome when the applicator is pivoted to the application position. The pliable dome is then compressed by the driving member to direct the aliquot of fluid through the plurality of channels and out of each respective applicator node.

In a further aspect of the present invention, each of the plurality of applicator nodes includes a perforation and the first arm and the second arm may be a continuous unitary construction.

In accordance with another aspect of the present invention, the second end of the second arm further includes a plurality of piercing elements. A respective piercing element is configured to be positioned proximate the terminus of each respective channel when the applicator is in the application position. Each piercing element of the plurality of piercing elements is configured to form a respective puncture within the selected portion of the plant before the aliquot of fluid is directed to each respective applicator node. The fluid injector may further include a plurality of guide members positioned proximate the terminus of each respective channel. Each respective guide member is configured to receive a respective piercing element therein when the applicator is in the application position and to direct the aliquot of fluid to each respective puncture within the selected portion of the plant.

In accordance with a further aspect of the present invention, a cartridge is removably coupled to the first arm and is in fluid communication with the reservoir defined by the diaphragm. The fluid injector may further include an injector valve between the cartridge and the diaphragm. The injector valve allows flow of the fluid from the cartridge to the reservoir when the applicator is in the rest position and prevents reverse flow of the fluid from the reservoir to the cartridge when the applicator is in the application position.

In a further aspect of the present invention, a cap configured to mount on the second ends of the first and second arms. The cap holds the applicator in the rest position and prevents pivoting of the arms to the application position.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
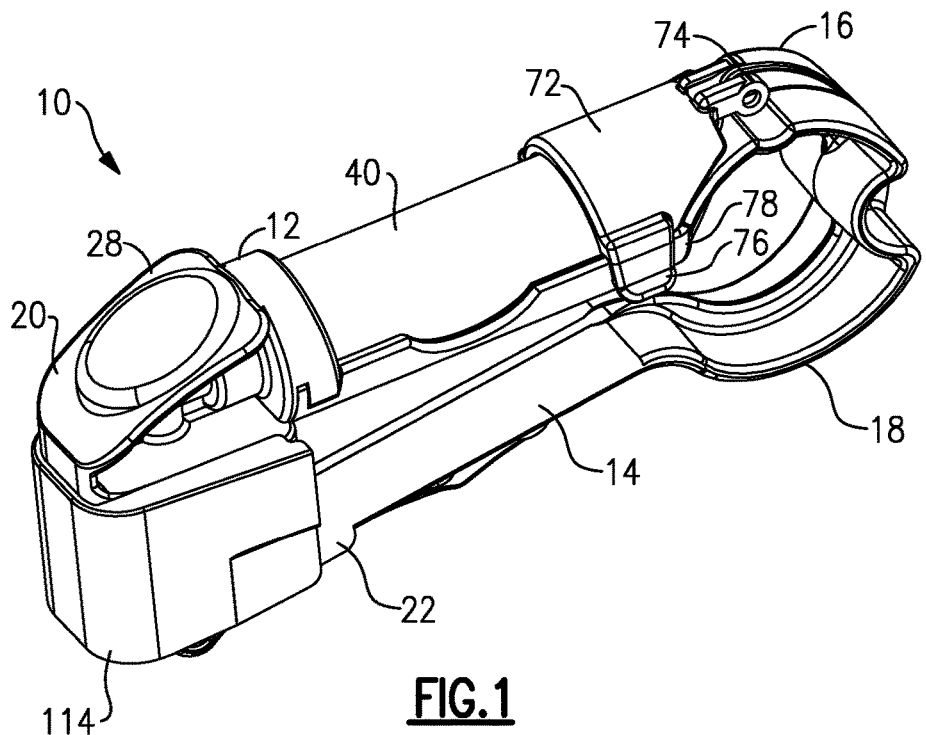
FIG. 1 is a perspective view of an embodiment of a fluid applicator with cap on in accordance with the present invention.

Referring now to FIGS. 1-5, there is shown an exemplary fluid applicator 10 in accordance with an aspect of the present invention. Applicator 10 generally comprises a first arm 12 and second arm 14 pivotally connected to one another at respective first ends 16, 18. In accordance with an aspect of the present invention, first arm 12 and second arm 14 are a continuous unitary construction. Opposing respective second ends 20, 22 are spaced apart from one another to define an opening 24 when applicator 10 is in a rest position, such as that shown in FIGS. 1-5 and 9. Second ends 20, 22 are sufficiently spaced apart such that a plant or portion of a plant, such as a leaf 26, may be received within opening 24, as will be described in greater detail below with regard to FIGS. 9 and 10. Second end 20 of first arm 12 includes a fluid injector 28 mounted thereon.

Figure 6:
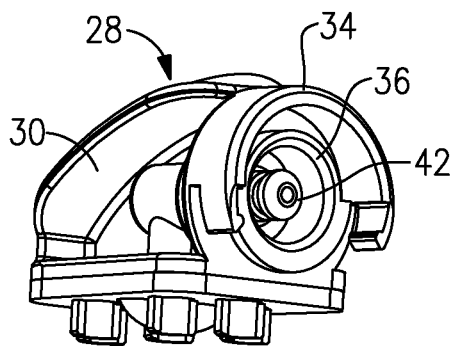
FIG. 6 is a rear perspective view of an embodiment of a fluid injector configured for use within the fluid applicator shown in FIG. 1.
Figure 7:
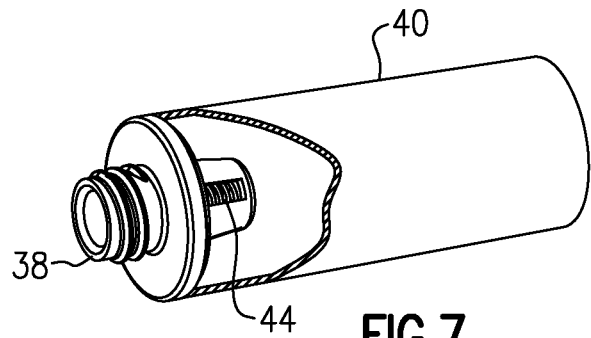
FIG. 7 is a perspective view of an embodiment of a fluid canister configured for use within the fluid applicator shown in FIG. 1.
Figure 8:
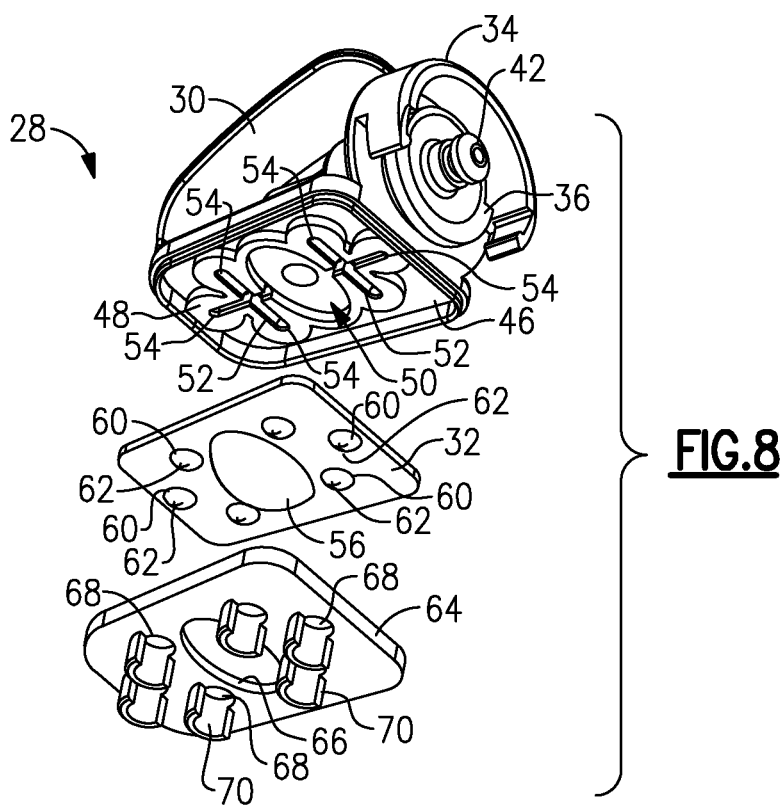
FIG. 8 is an exploded view of the fluid injector shown in FIG. 6.

With additional reference to FIGS. 6 and 8, fluid injector 28 includes an injector body 30 and a diaphragm 32 coupled thereto. First end 34 of injector body 30 includes a collar 36 configured to receive a corresponding shaft 38 on a fluid cartridge 40 (see e.g., FIG. 7). In accordance with an aspect of the present invention, shaft 38 is threadably coupled to collar 36. As will be discussed in greater detail below, first end 34 further includes a post 42 which is configured to engage a spring-loaded plunger 44 assembly (e.g., FIG. 9.) whereby fluid within cartridge 40 may flow into fluid injector 28. In accordance with another aspect of the present invention, cartridge 40 is designed as a removable, replaceable consumable. To that end, shaft 38 may include a removable cap (not shown) during storage of cartridge 40, with the cap being removed prior to coupling of cartridge 40 with fluid injector 28.

Figure 9:
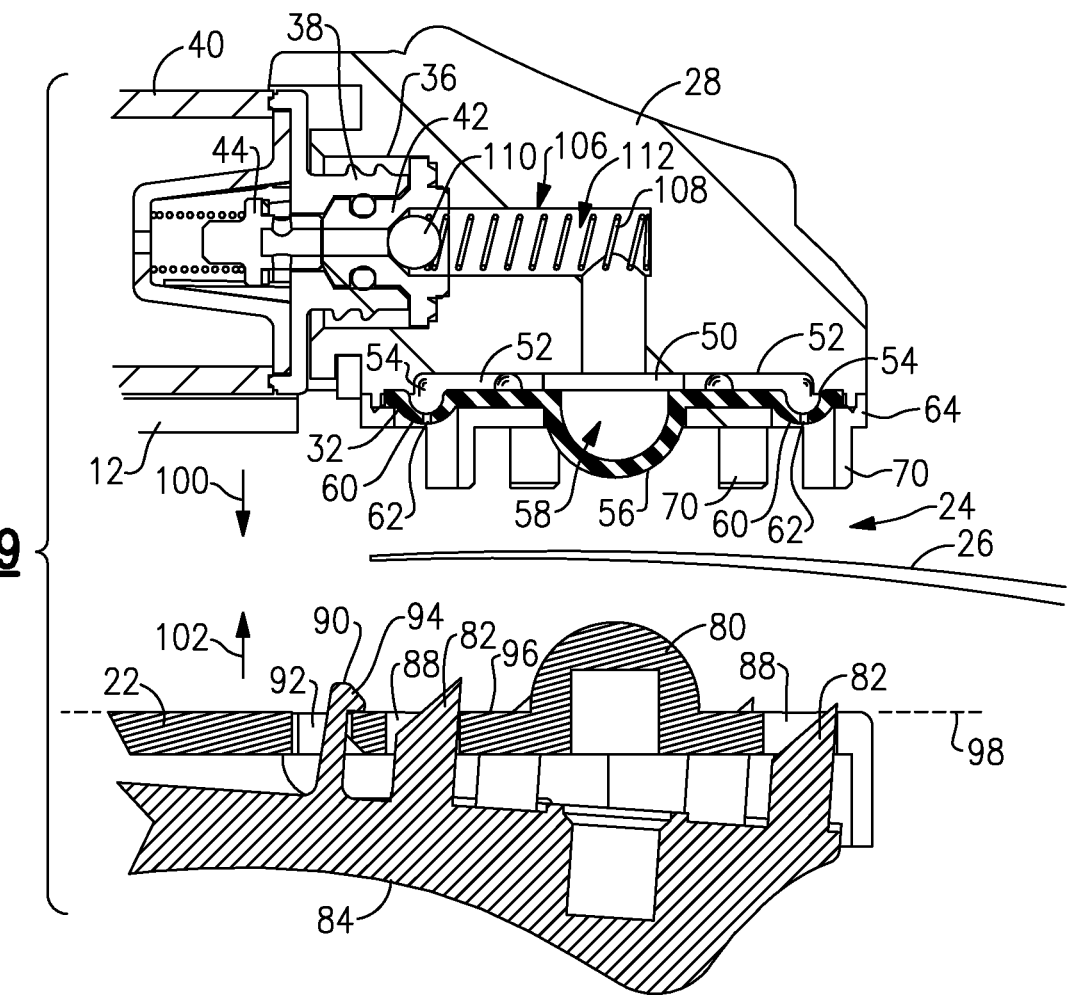
FIG. 9 is an expanded side cross section view of the fluid applicator shown in FIG. 1 showing the fluid applicator in a rest position.

Bottom wall 46 of injector body 28 includes a raised ledge portion 48 which defines a recess 50 in fluid communication with post 42 as will discussed in greater detail below. Bottom wall 46 and ledge portion 48 further define a plurality of channels 52 which are fluidly connected to recess 50. As shown most clearly in FIG. 8, channels 52 may have a branched layout ending at respective termini 54. Diaphragm 32 is coupled to bottom wall 46 and is configured to form a fluid tight seal against ledge portion 48. Diaphragm 32 includes a pliable dome 56 positioned adjacent to recess 50 so as to form a reservoir 58 therebetween for holding fluid received from cartridge 40 (FIG. 9). Diaphragm 32 further includes a plurality of applicator nodes 60 which are positioned on diaphragm 32 so that each respective node 60 coincides with a respective terminus 54. Each node 60 may include a perforation 62 therein whereby fluid may be expelled outwardly of the node, as will be discussed below.

Fluid injector 28 may further include a base plate 64 coupled to bottom wall 46 and configured to cover diaphragm 32 and secure diaphragm 32 between bottom wall 46 and base plate 64. Base plate 64 defines a large orifice 66 proportioned to receive and allow passage of pliable dome 56 therethrough. Base plate 64 similarly includes a plurality of smaller orifices 68 proportioned to receive and allow passage of applicator nodes 60 therethrough. Base plate 64 may further include a plurality of downwardly extending guide members 70. A respective guide member 70 is positioned proximate a respective terminus 54 and applicator node 60 and may assist in directing fluid expelled through each perforation 62.

Figure 4:
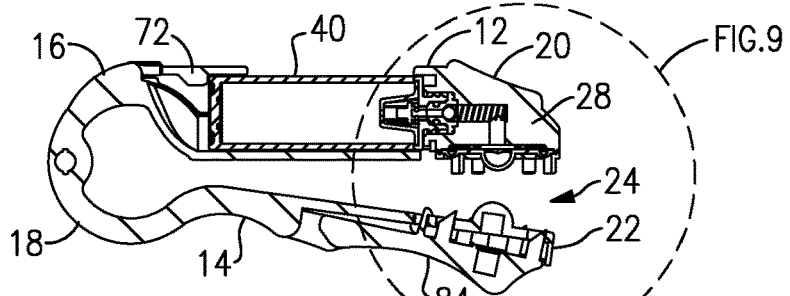
FIG. 4 is a cross section view of the fluid applicator taken generally along line 4-4 as shown in FIG. 3.
Figure 5:
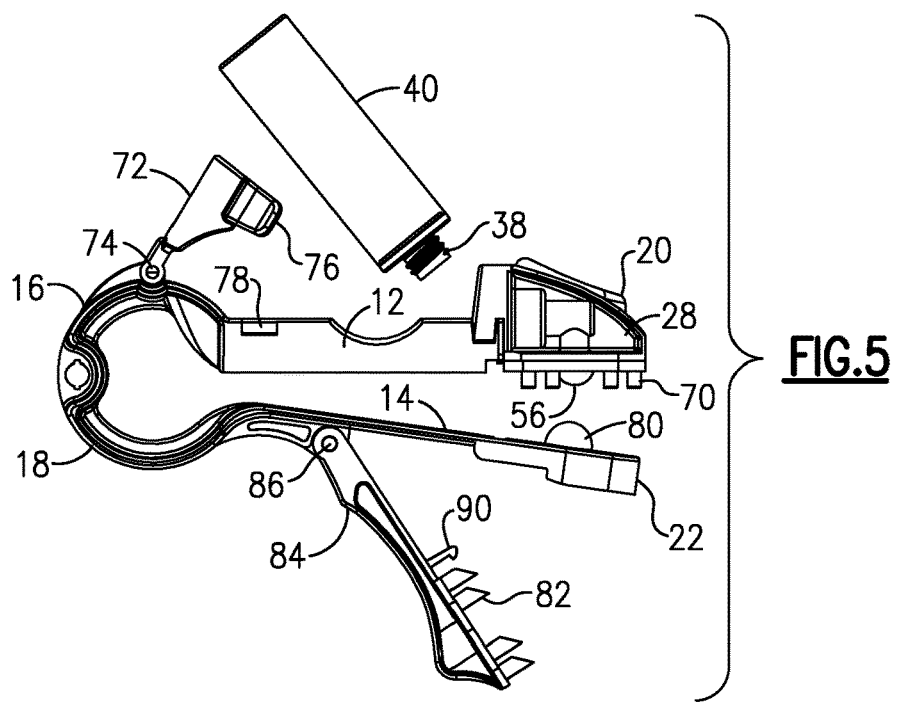
FIG. 5 is a side view of the fluid applicator shown in FIG. 1 showing removal/replacement of a fluid cartridge.

With reference to FIGS. 5 and 7, cartridge 40 may be removably coupled to first arm 12. Cartridge 40 holds a liquid, such as an herbicide, which is delivered to a plant, e.g., leaf 26, as will be described below. In accordance with an aspect of the present invention, cartridge 40 is configured to be swappable with another cartridge, such as when cartridge 40 is empty of fluid or when a different fluid is desired to be delivered to the plant. To that end, first arm 12 includes a cartridge clasp 72 having a pivot end 74 pivotally connected to first arm 12 proximate first end 16. An opposing clip end 76 of cartridge clasp 72 is configured to engage sidewall portion 78 of first arm 12 to secure cartridge clasp 72 in a closed position, such as that shown in FIGS. 1-4. To swap cartridge 40, clip end 76 is lifted free of sidewall portion 78 such that cartridge clasp 72 pivots about pivot end 74. Cartridge 40 may then be removed from first arm 12. The same or a different cartridge may then be recoupled with first arm 12 with cartridge clasp 72 being reverse pivoted until clip end 76 reengages sidewall portion 78 thereby securing the replacement cartridge within applicator 10.

Figure 2:
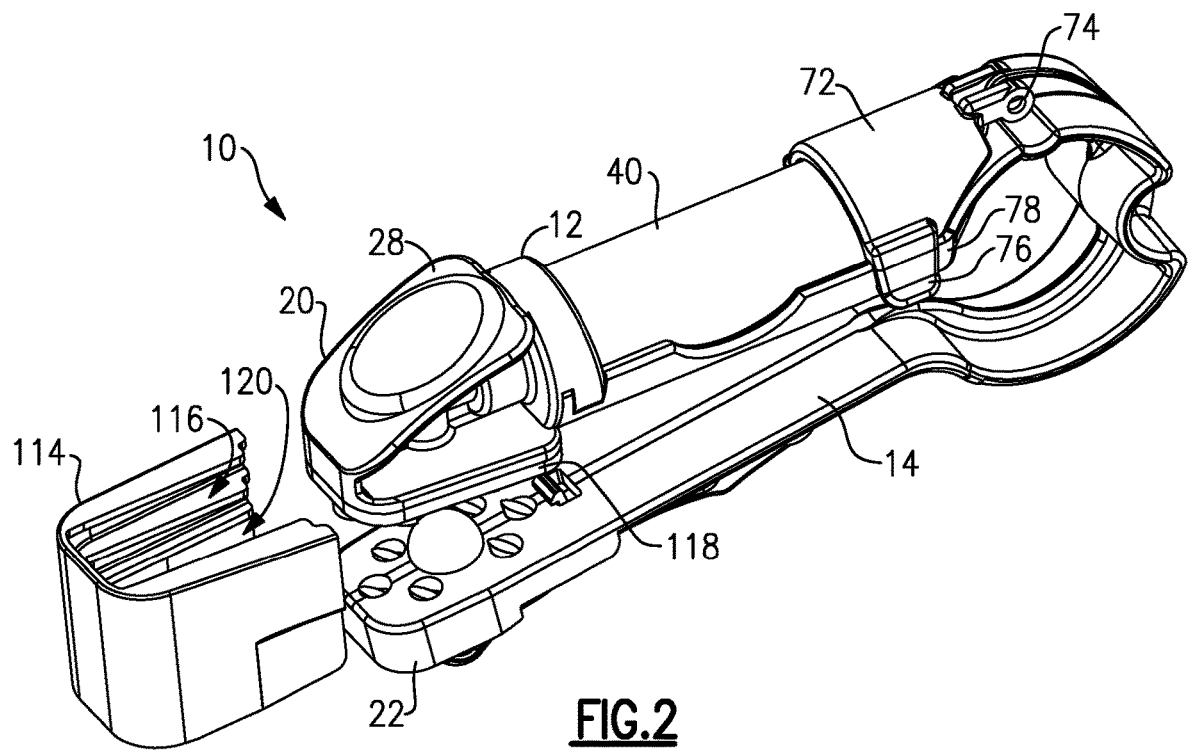
FIG. 2 is a perspective view of the fluid applicator shown in FIG. 1, with the cap off.
Figure 3:
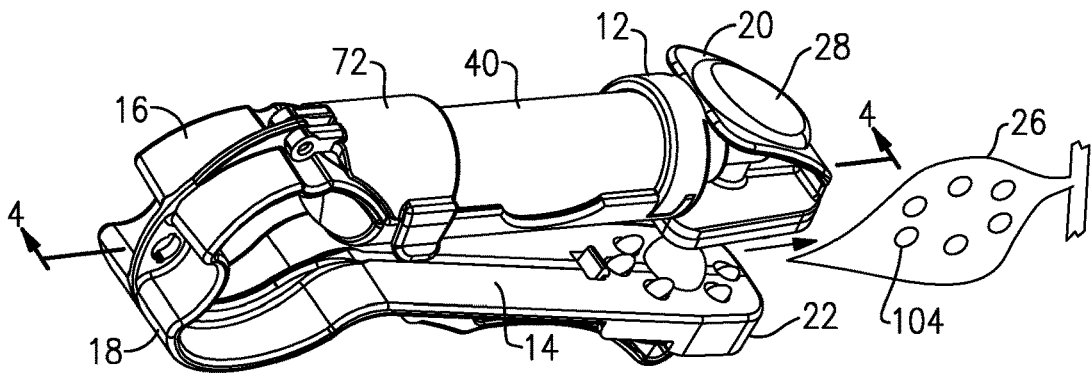
FIG. 3 is a rear perspective view of the fluid applicator shown in FIG. 1 after puncturing a leaf of a plant.
Figure 10:
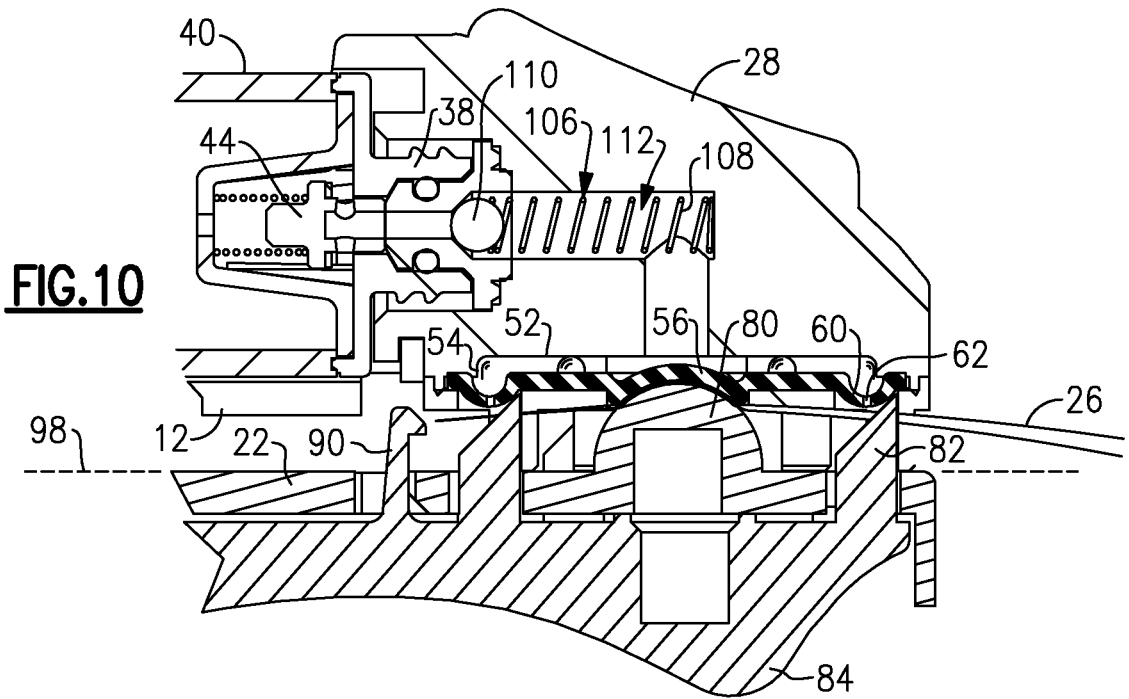
FIG. 10 is an expanded side cross section view of the fluid applicator shown in FIG. 1 showing the fluid applicator in an application position.

With reference to FIGS. 2-4, second end 22 of second arm 14 includes a driving member 80 which is positioned to engage pliable dome 56 when applicator 10 is pivoted to the application position (FIG. 10). Second end 22 may further include a plurality of piercing elements 82. A respective piercing element 82 is positioned to coincide with and be slidably received within a respective guide member 70. In accordance with an aspect of the present invention, piercing elements 82 are carried on a piercing member 84 which is pivotally coupled to second arm 14 at a pivot point 86 (see FIG. 5). To accommodate reciprocal movement of piercing member 84, second end 22 may define a plurality of piercing orifices 88 through which piercing elements 82 may travel.

Piercing member 84 may also include a clip 90 configured to pass through a clip orifice 92 defined by second end 22. Clip 90 may have a barbed end 94 which engages top surface 96 of second end 22 when applicator 10 is in the rest position (see FIG. 9). In this manner, piercing elements 82 may be flush with, or extend slightly above plane 98 defined by top surface 96. As a result, unwanted damage to the plant, as well as the potential of unwanted scratching or puncturing of a user's finger or hand, is minimized. The length of clip 90 is proportioned such that piercing elements 82 remain within their respective piercing orifices 88 when applicator 10 is in the rest position as described above, but extend outwardly beyond plane 98 when applicator 10 is pivoted to the application position (FIG. 10). It should noted that, as shown in FIG. 5, barbed end 94 may be decoupled from top surface 96 such that piercing member 84 may pivot a greater extent from second end 22. This larger opening between piercing member 84 and second arm 22 may aid in cleaning of applicator 10 when desired or required.

Operation of applicator 10 will be discussed with reference to FIGS. 9 and 10. As shown in FIG. 9, applicator 10 is in a rest position with respective second ends 20, 22 are spaced apart from one another to define an opening 24. A portion of a plant, such as leaf 26, is positioned within opening 24. Pliable dome 56 is filled with fluid from cartridge 40. Such situated, second end 20 of first arm 12 and second end 22 of second arm 14 are then pivoted toward one another, as generally indicated by arrows 100, 102, such as through manual squeezing of applicator 10. Pivoting proceeds until guide members 70 on fluid injector 28 contact top surface 96 of second end 22. Applicator 10 is now in an application position as shown in FIG. 10. As second ends 20, 22 are pivoted toward one another, driving member 80 engages pliable dome 56 and compresses pliable dome 56 thereby forcing reservoir 58 to a collapsed orientation (FIG. 10). As reservoir 58 collapses, positive pressure causes the fluid within the reservoir to be directed through channels 52 to channel termini 54. The fluid is then expelled out of each terminus 54 through perforation 62 and onto leaf 26. Concurrently, piercing member 84 is pivoted about pivot point 86 (FIG. 5) such that piercing elements 82 engage with and pierce leaf 26 so as to form punctures 104 (FIG. 3). In this manner, fluid expelled through perforations 62 may bypass the generally fluid-resistant barrier of the top layer of the leaf and enter the internal structure of the leaf, thereby more effectively delivering the fluid chemical to the plant.

In accordance with an aspect of the present invention, first and second arms 12, 14 are biased to the rest position in the absence of any actuating force, e.g., squeezing applicator 10 as described above. Thus, release from manually squeezing applicator 10 will cause arms 12, 14 to reverse pivot from the application position (FIG. 10) to the rest position (FIG. 9). Likewise, pliable dome 56 is also biased to form expanded reservoir 58 when applicator 10 is in the rest position. As a result, as arms 12, 14 pivot to the rest position (FIG. 9), second ends 20, 22 separate so as to reform opening 24 therebetween. Concurrently, driving member 80 disengages from pliable dome 56 such that reservoir 58 reforms. Expansion of pliable dome 56 creates a negative pressure within reservoir 58 which operates to open a check valve 106 mounted in part within post 42. The spring constant of spring 108 of check valve 106 is selected such that the negative pressure created by the expansion of pliable dome 56 is greater than the spring constant. As a result seal 110 (e.g., a ball bearing) is opened wherein fluid within cartridge 40 may enter fluid channel 112 and refill reservoir 58. Once pressures within fluid injector 28 have equalized, check valve 106 may close, thereby preventing reverse flow of fluid into cartridge 40 during application, as described above.

In accordance with another aspect of the present invention, a cap 114 may be removably mounted on respective second ends 20, 22 of first arm 12 and second arm 14 when applicator 10 is in the rest position. When mounted (FIG. 1), cap 114 holds applicator 10 in the rest position and prevents pivoting of arms 12, 14 to the application position (FIG. 10). By way of example and without limitation thereto, cap 114 may define an upper slot 116 configured to receive sidewall 118 of second end 20 and a lower slot 120 configured to receive second end 22 therein. Cap 114 may thus protect a user from unwanted contact with piercing elements 82 while also preventing engagement of driving member 80 with pliable dome 56 so as to inhibit unwanted discharge of fluid from applicator 10.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An applicator for introducing a fluid to a selected portion of a plant, the applicator comprising:

a) a first arm having a first end and an opposing second end;
   b) a second arm having a first end and an opposing second end, wherein said first ends are pivotally connected to one another, and wherein said opposing second ends are spaced apart so as to receive the selected portion of the plant therein when the applicator is in a rest position and wherein said opposing second ends are configured to be driven together upon pivoting of said first and second arms to place the applicator in an application position;
   c) a fluid injector mounted on said opposing second end of said first arm, said fluid injector comprising:
      i) an injector body; and
      ii) a diaphragm coupled to said injector body and defining a plurality of covered channels therebetween, said diaphragm including a pliable dome defining a reservoir configured to receive an aliquot of the fluid and a plurality of applicator nodes, wherein a respective applicator node is positioned proximate a terminus of each respective covered channel of said plurality of covered channels; and
   d) a driving member mounted onto said opposing second end of said second arm and configured to engage said pliable dome when the applicator is pivoted to said application position, wherein said pliable dome is compressed by said driving member to direct the aliquot of the fluid through said plurality of covered channels and out of each respective applicator node.

2. The applicator in accordance with claim 1 wherein each of said plurality of applicator nodes includes a perforation.

3. The applicator in accordance with claim 1 wherein said opposing second end of said second arm further includes a plurality of piercing elements, wherein a respective piercing element is configured to be positioned proximate said terminus of each respective covered channel when the applicator is in said application position, and wherein each piercing element of said plurality of piercing elements is configured to form a respective puncture within said selected portion of said plant before said aliquot of the fluid is directed to each respective applicator node.

4. The applicator in accordance with claim 3 wherein said fluid injector further includes a plurality of guide members, wherein a respective guide member is positioned proximate said terminus of each respective covered channel, wherein each respective guide member is configured to receive a respective piercing element therein when the applicator is in said application position and direct said aliquot of the fluid to each respective puncture within said selected portion of said plant.

5. The applicator in accordance with claim 1 and further comprising:

e) a cartridge removably coupled to said first arm and in fluid communication with said reservoir defined by said diaphragm.

6. The applicator in accordance with claim 5 wherein said fluid injector further comprises:

iii) an injector valve between said cartridge and said diaphragm, wherein said injector valve allows flow of said fluid from said cartridge to said reservoir when the applicator is in said rest position and prevents reverse flow of said fluid from said reservoir to said cartridge when the applicator is in said application position.

7. The applicator in accordance with claim 1 wherein said first arm and said second arm are a continuous unitary construction.

8. The applicator in accordance with claim 1 and further comprising:
   e) a cap configured to mount on said opposing second ends of said first and second arms, wherein said cap holds said applicator in said rest position and prevents pivoting of said first and second arms to said application position.

\* \* \* \* \*